United States Patent Office 3,452,982
Patented July 1, 1969

3,452,982
DEVICE FOR STACKING SHEET STOCK
Emil Bischoff, Pforzheim, Germany, assignor to Karl Fr. Ungerer, Pforzheim, Germany, a company of Germany
Filed July 20, 1967, Ser. No. 654,845
Claims priority, application Germany, Aug. 20, 1966,
U 13,027
Int. Cl. B65h 29/24
U.S. Cl. 271—74                                      3 Claims

ABSTRACT OF THE DISCLOSURE

The invention relates to a flat conveying member for transporting sheet material suspended therefrom by means of a suction force, said member provided with a plastic layer having a plurality of suction holes that also extend through the entire member, the suction holes ending in the base of a plurality of outwardly open channels extending in said plastic layer which channels, in turn, are separated from one another by elevated portions directly engaging said sheets during the transportation thereof.

Background of the invention

This invention relates to an improved device for conveying sheet stock held by suction and depositing the same at predetermined locations to form stacks. More particularly, the invention relates to a novel structure of an endless conveyor belt having an upper flight and a lower flight, the upper face of said lower flight is passed under a series of suction heads. The belt is of the type having a plurality of perforations or suction holes preferably arranged in rows normal to the length of the belt; said holes end in flat suction channels disposed in the downwardly directed belt face opposite from said suction heads. Between the suction channels there is provided at least one elevated portion for the engagement of the sheets with the belt.

A device of this type is described in U.S. Patent No. 3,123,354 wherein the conveyor belt is provided with a plurality of suction holes which, on the face opposite from the suction heads, are surrounded by elevations preventing an overall contact between the entire face of the sheet to be conveyed and the belt holding the sheet by means of suction applied to the suction holes by suction heads. Thus, between the sheet to be conveyed and the belt there is maintained an open space from which air may be withdrawn only by overcoming an substantial resistance. The elevations may comprise lengthwise extending strips protruding from the belt face and including suction channels therebetween. Or, the elevations may be individual projections each surrounding the opening of a suction hole in a ring-like manner. The purpose of such a surface structure is to decrease the force of adhesion between the conveyed sheet and the conveyor belt. At the same time, the vacuum fields disposed about the suction holes in the intermediate spaces between the sheet and the belt face cause an increase of the active suction area.

Summary of the invention

The object of the invention is to provide an improved conveying member for conveying and stacking sheet stock which may be manufactured very economically and which, due to the material properties of its working face ensures a very small force of adhesion on one hand and a superior suction effect per suction hole on the other hand while no markings will appear on the sensitive sheet faces in the areas of suction.

Briefly stated, according to the invention, the flat conveying member is provided—at least on its face opposite from the suction heads—with an outer layer of synthetic material which contains the aforenoted suction channels. The channels may be provided by molding, or they may be cut or rolled into the surface of the plastic layer.

The smooth and firm plastic surface exerts a very small adhesion force to the sheet at the elevations where the contact between the sheet and the flat conveying member takes place. On the other hand, despite its large wear resistance, the plastic surface is pliable to the extent that it conforms to the possible irregularities in the surface of the sheet whereby an intimate contact between the sheet and the conveyor face is achieved. This intimate contact makes it possible to generate vacuum fields of high intensity in the suction channels between the elevations, resulting in a large suction force urging the sheet against the face of the elevated portions.

The invention and its application will be better understood from the ensuing specification taken in conjunction with the drawings showing an exemplary embodiment.

Description of the preferred embodiment

Figure 1:
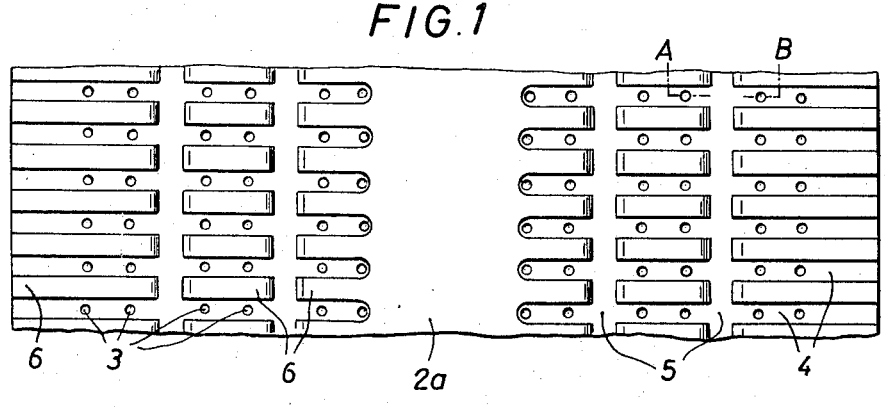
FIG. 1 is a plan view of a length portion of the novel conveying member taken of the face opposite from the suction heads.
Figure 2:
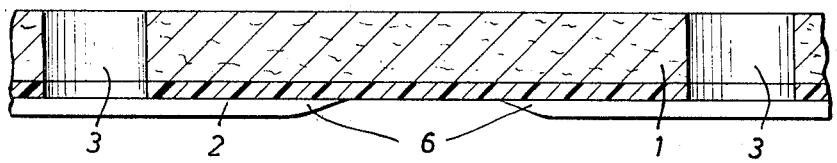
FIG. 2 is a sectional view along lines A–B of FIG. 1.

Turning now to FIGS. 1 and 2, there is shown a novel conveying member comprising a base 1 (usually made of fabric) to one face of which there is secured, e.g. by means of bonding, a plastic layer 2 made, for example, of polyvinyl chloride, polytetrafluoroethylene, polyurethane or other material. The conveying member is provided with a plurality of suction holes 3 extending through both the base 1 and the layer 2 and arranged in parallel extending rows along both edge portions of the belt. Each row is disposed normal to the length dimension of the member and terminates before the centerline thereof so as to leave a longitudinal central strip 2a that is free of holes (FIG. 1). The suction holes of the same row terminate in a common suction channel or groove 4 in the plastic layer 2. Each channel extends from the edge of the member to the suction hole remotest from the edge so that central strip 2a, in addition to being free of suction holes, does not contain any suction channels either. On either side of the strip 2a the suction channels 4 are interconnected by a pair of parallel suction channels 5 extending parallel to the length dimension of the member. Relatively flat suction channels are preferred; their width is preferably about 2½ times larger than the diameter of a suction hole 3.

Those portions of plastic layer 2 that separate the suction channels 4 or 5 from one another constitute elevations 6, the upper face of which directly contacts the individual sheet (not shown) when vacuum is applied by suction heads (not shown) disposed adjacent the free outer face of fabric base 1. Due to their surface properties these elevations which, depending upon the course of the suction channels 4 and 5 and the spacings therebetween, may have a rectangular, round or any other contour, do not leave an imprint on the surface of the conveyed sheet even if the later is provided with an oily film.

Figure 3:
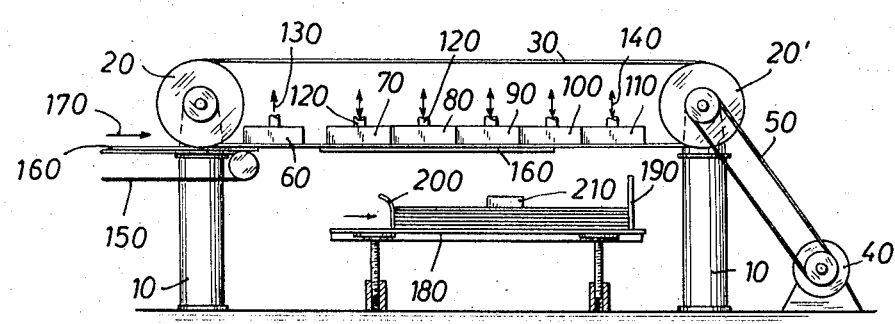
FIG. 3 is a schematic elevational view of a stacking apparatus using the novel conveying member.

The above-described conveying member may be advantageously used in a stacking apparatus for piling sheet stock described hereinafter in connection with schematic FIG. 3. There is provided a pair of spaced uprights 10 on which there are mounted in a substantially common, vertical plane, two pulleys 20 and 20', respectively. About pulleys 20 and 20', there is trained an endless conveying and stacking belt 30 constructed according to the invention. The belt 30 is arranged on the pulleys in such a manner that its base 1 (FIG. 2) faces inwardly and directly contacts the pulleys, while the plastic layer 2 (FIG. 2) faces outwardly. Belt 30 is continuously moved by motor 40 which imparts a rotary motion to pulley 20' through transmission belt 50.

Adjacent and along the upper face of the lower flight of belt 30, there are disposed a plurality of suction heads 60, 70, 80, 90, 100 and 110, each having a nipple 120 adapted to receive conduit means (not shown) for communicating pressure or vacuum. As indicated by the unidirectional arrow 130, during operation, the suction head 60 is continuously vacuumized while the other suction heads are, in a controlled manner, either vacuumized or presurized as suggested by bi-directional arrows 140.

Adjacent the stacking belt 30, there is disposed a conveyor belt 150, the upper flight of which is substantially coplanar with the lower flight of stacking belt 30. The sheets 160, positioned on the upper face of the upper flight of conveyor 150, are conveyed in the direction of arrow 170 in single file to the beginning of the lower face of the lower flight of belt 30 and are picked up thereby as vacuum is applied thereto through suction holes 3. The sheets 160, attracted to belt 30 by the vacuum generated by vacuum heads 70, 80, 90, 100 and 110 are carried over the stacking table 180 provided with sheet guiding means 190, 200 and 210. At appropriate moments the vacuum in heads 70, 80, 90, 100 and 110 is discontinued to allow the sheet to drop onto the stacking table 180.

It is to be understood that the precedingly described stacking machine is merely an example of the use of the novel conveying and stacking member. Thus, it would be within the scope of the invention to use, e.g., a rectangular piece of the novel member fixedly mounted with respect to the suction heads and reciprocable therewith as a unit between a conveyor such as indicated with reference numeral 150 in FIG. 3 and a stacking table 180.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

What is claimed is:
1. In a sheet stacking apparatus of the type having a perforated endless belt for transporting said sheets suspended from and adhering to the outer face of the lower flight of said belt by means of vacuum, the improvement in said belt comprising,
- (A) a plurality of parallel spaced suction grooves provided in said outer face, each said groove extending from at least one edge of said belt, each groove being open towards the belt edge from which it extends,
- (B) a plurality of suction holes extending through said belt and opening into said grooves, and
- (C) a plurality of elevated portions each delimited by two immediately adjacent grooves, each elevated portion adapted to directly engage said sheets when vacuum is applied to said suction holes, said outer face of said belt at least to a depth of said grooves being of a plastic material.

2. The improvement as defined in claim 1, wherein a first group of said grooves extends from one edge of said belt, and a second group of said grooves extends from the opposed edge thereof, the grooves of both said groups terminate short of the longitudinal center line of said belt leaving a longitudinal area or strip thereon free of grooves and holes.

3. The improvement as defined in claim 1, wherein said belt is formed of a base having an internal face and an external face and of a plastic layer bonded to said external face, said plastic layer contains said grooves and said elevated portions on its side remote from said base.

References Cited
UNITED STATES PATENTS

| | | |
|---|---|---|
| 2,693,403 | 11/1954 | Brumbaugh. |
| 2,809,130 | 10/1957 | Rappaport. |
| 3,140,030 | 7/1964 | Stewart _____ 271—74 |

RICHARD E. AEGERTER, *Primary Examiner.*